United States Patent [19]

Matthews et al.

[11] Patent Number: 4,988,737
[45] Date of Patent: Jan. 29, 1991

[54] PROCESS FOR REGENERATING ION EXCHANGE RESINS LOADED WITH NAPHTHENIC AND OTHER ORGANIC ACIDS

[75] Inventors: W. Thomas Matthews, Alamo; H. Hunter Paalman, Walnut Creek, both of Calif.

[73] Assignee: The Dow Chemical Company, Midland, Mich.

[21] Appl. No.: 38,437

[22] Filed: Apr. 13, 1987

Related U.S. Application Data

[63] Continuation of Ser. No. 814,358, Dec. 30, 1985, abandoned.

[51] Int. Cl.$^5$ .................................................. L08J 5/20
[52] U.S. Cl. ...................................... 521/26; 528/495; 528/496; 528/501
[58] Field of Search .................. 521/26; 528/495, 496, 528/501

[56] References Cited

U.S. PATENT DOCUMENTS

| | | | |
|---|---|---|---|
| 2,718,487 | 9/1955 | Coonradt et al. | 521/26 |
| 4,051,079 | 9/1977 | Melby | 521/26 |
| 4,496,667 | 1/1985 | Reichgott et al. | 521/26 |
| 4,526,904 | 7/1985 | Kishida et al. | 521/26 |

FOREIGN PATENT DOCUMENTS

169048  9/1975  Poland .

*Primary Examiner*—Peter F. Kulkosky

[57] ABSTRACT

A process for regenerating anion exchange resins loaded with organic contaminants is described. The anion exchange capacity of loaded resins can be increased by treatment with an aqueous mixture of a strong mineral acid and an organic solvent for naphthenic acid.

21 Claims, No Drawings

PROCESS FOR REGENERATING ION EXCHANGE RESINS LOADED WITH NAPHTHENIC AND OTHER ORGANIC ACIDS

CROSS-REFERENCE TO RELATED APPLICATION

This is a continuation of application Ser. No. 814,358, filed Dec. 30, 1985, now abandoned.

BACKGROUND OF THE INVENTION

The present invention pertains to an improved method for regenerating anion exchange resins loaded with organic compounds. More particularly, this method is useful to regenerate resins loaded with naphthenic acid and other organic acids.

Anion exchange resins are conventionally used to treat water. Organic substances present in the water accumulate on the ion exchange resin. These organic substances generally can include naphthenic acid, other organic acids, phenols, alcohols, pyridines, amines and organic sulfides. Over an extended period of operation, the ion exchange capacity of a resin declines significantly and some of the organic materials cannot be eluted by conventional methods.

Weak base ion exchange resins are conventionally used in the free base form of the amine to treat water. Caustic is commonly used to regenerate the resin by neutralization and displacement of organic compounds on the resin. However, it has been found that when an anion exchange resin has been loaded with naphthenic acid and like organic compounds, caustic treatment may restore significantly less than 90 percent of the original anion exchange capacity after repeated uses.

A variety of techniques have been proposed in the prior art for regeneration of ion exchange resins. Brine optionally with caustic has been used to regenerate ion exchange capacity. U.S. Pat. Nos. 3,536,637; 3,748,825 and 4,153,761 are illustrative of prior art techniques for removing organic compounds. U.S. Pat. No. 4,511,676 discloses that diethylene glycol compounds are particularly effective in restoring activity of ion exchange resins fouled with humic substances.

Anion exchange resins loaded with organic compounds in treating oil field waste waters are particularly difficult to regenerate. The relatively high concentrations of organic compounds encountered with oil field waters necessitates frequent regeneration of resins used in treating such waters. Moreover, the resistance of certain of these organic compounds to conventional methods of regenerating resins heretofore rendered the clean up of oil field waters with ion exchange resins impractical. A simple cost effective method for restoring the ion exchange capacity of resins adversely loaded with organic compounds is desired. Additionally, resins which efficiently remove organic compounds from waters produced in oil field operations and which can be regenerated readily are of practical and commercial interest.

SUMMARY OF THE INVENTION

The present invention is directed to a method for regenerating the anion exchange capacity of an anion exchange resin loaded with organic acids and other organic contaminants. This method comprises contacting the resin with an aqueous liquid mixture of a strong mineral acid and an organic solvent in which naphthenic acid is soluble to a concentration of at least about 1 percent at 20° C. The mixture should have an acid concentration of at least about 0.5 weight percent. The contact between the resin and the aqueous liquid should occur for sufficient time to substantially restore the effective anion exchange capacity of the resin.

The present invention is also directed to the use of anion exchange resins bearing a plurality of tertiary amine hydrochloride groups to remove organic compounds from water. The resins when loaded with organic compounds can be regenerated as described hereinafter.

The present invention is further related to an improved process for regenerating a weak base anion exchange resin comprising soaking the resin in an aqueous liquid mixture of a $C_2$ to $C_5$ alkanol and at least 2 weight percent of a strong mineral acid for a period sufficient to regenerate additional anion exchange capacity.

DETAILED DESCRIPTION OF THE INVENTION

The anion exchange resins regenerated are well known in the art. The anion exchange resin is operably a weak base anion exchange resin or a resin bearing both strong and weak base moieties. These resins can be derived from a variety of polymers, including styrene/divinyl benzene copolymer, epichlorohydrin-amine condensate and acrylic polymers. The structure, porosity and anion exchange capacity of the resin can vary over a considerable range. Preferred anion exchange resins which can be regenerated by the subject process is a weak base resin having a plurality of tertiary amine groups on a styrene/divinyl benzene copolymer backbone.

The weak base anion exchange resin is preferably a macroporous-type resin of the conventional 16 to 50 mesh size with total amine exchange capacity of from 1 to 2 equivalents per liter and weak base functionality of 1.2 to 1.5 equivalents per liter (drained wet resin volume basis). The weak base resin typically bears a mixture of primary, secondary and tertiary amine groups dispersed through the resin matrix, with tertiary amine groups preferably predominant.

The organic compounds of concern are in general naphthenic acids, phenolics, fatty acids, humic acid, fulvic acid and other organic acids present in connate water or waters produced in oil field operations. These organic constituents are conventionally determined quantitatively on the basis of their distribution between water and a fluorocarbon solvent. The standard Environmental Protection Agency method for analysis of contaminants present in water defines "oil and grease" to be contaminants soluble in Freon® 113 fluorocarbon solvent but not substantially volatilized when the solvent is evaporated at 70° C. to leave a non-volatile residue.

The concentration of "oil and grease" in waters to be treated with anion exchange resins operably varies over a wide range. The concentration of organic compounds in the aqueous liquid treated with anion exchange resins ranges from less than about 1 to about 5,000 parts per million (ppm) by weight. Typically, the concentration of organic compounds is in the range from about 50 to about 1,000 ppm.

The anion exchange resin conventionally will be disposed in a packed bed or column through which the aqueous liquid mixture used to regenerate the resin will pass. However, any disposition of the resin which affords intimate contact with the liquid to be treated and ready recovery of the resin is operable.

The regeneration of the loaded anion exchange resin is generally conducted batchwise or semi-batchwise. In one preferred mode of treatment, the resin is treated by passing the aqueous liquid mixture through one column or series of ion exchange columns, while a second column or series of ion exchange columns is being used for water treatment. The regenerated anion exchange resin is switched into operation, when the second column or columns become loaded. The second ion exchange resin is in turn regenerated. The regenerant liquid can be passed through the resin in the same direction as the water treated by the resin or can be introduced as a back flush, where the resin bed permits.

The aqueous liquid mixture used to regenerate the anion exchange resin should include a sufficient concentration of a strong mineral acid to acidify conjugate bases of the organic acids present on the loaded resin. Preferably from the standpoint of ease of regeneration and processing, the mixture contains at least about 1 weight percent, more preferably at least about 2 weight percent, most preferably from about 4 to about 10 weight percent acid. Strong mineral acids are inorganic protonic acids which in a 0.1 normal aqueous solution have a pH of not greater than about 1. Illustrative of strong mineral acids are hydrochloric acid, nitric acid and sulfuric acid. The preferred mineral acid is hydrochloric acid The organic solvent present should be one in which the organic contaminants on the loaded resin are readily soluble. Additionally, the organic solvent should be susceptible to recovery for recycle by distillation or other conventional techniques. Preferably, the organic solvent forms a single phase with the strong mineral acid and water in the liquid mixture prior to contact with the resin. Polyfunctional alcohols of at least three carbon atoms are operable, but monohydric alkanols are preferred. Preferred organic solvents include alkanols or inertly substituted alkanols having from 2 to 5 carbon atoms. Inertly substituted denotes that the substituents presence does not adversely affects the resin or the regeneration process. More preferred solvents are secondary alkanols having 3 or 4 carbon atoms, even more preferably isobutanol or 2-butanol. The most preferred solvent is 2-butanol (i.e., secondary butyl alcohol).

The organic solvent should comprise a sufficient part of the aqueous regenerating mixture to dissolve organic contaminants removed from the resin. Preferably, the organic solvent comprises from about 20 to about 90 volume percent, more preferably from about 50 to about 75 volume percent of the aqueous mixture. In one preferred embodiment of this invention, the aqueous liquid mixture comprises about 13 to about 40 volume percent water, about 55 to about 70 volume percent 2-butanol and about 5 to about 17 volume percent of concentrated (36 weight percent) aqueous hydrogen chloride.

In one embodiment of the invention, the aqueous liquid mixture is a single phase before contacting the loaded anion exchange resin, but is initially biphasic after contact. The presence of naphthenic acid or other organics in the mixture has been found to significantly increase the range of compositions of acid, water and alkanol for which two phases are observed. In this method the composition of the liquid mixture can be such that the dissolution of organic compounds into the liquid mixture renders at least part of the organic solvent insoluble in water. The organic phase in the resulting biphasic mixture will contain a major portion of the organic contaminants. As the regeneration continues, the aqueous liquid contacting the resin which can be initially biphasic will later be a single phase because of the lesser concentrations of organic contaminants.

The organic phase can be separated from the aqueous phase in the biphasic mixture by conventional methods. The aqueous phase can be recycled directly and the organic phase distilled to recover the organic solvent for recycle. An alkanol solvent generally can distill as an azeotrope with water dependent on relative concentrations. Where an azeotrope is formed, the water/organic solvent balance of the original aqueous liquid mixture should be selected so as to minimize the need for make up water or solvent during recycle. The largely aqueous residue which does not distill overhead may be further processed to recover components of value. For example, naphthenic acid may be recovered from this acidic residue by separation of the organic phase of the aqueous residue or recovery by other conventional techniques.

The method of this invention is not limited to embodiments wherein a biphasic mixture results from regeneration of the resin. The aqueous acidic liquid after contacting the resin can operably be a single phase. In some embodiments this is preferred as it results in simpler processing of the regenerant.

The temperature during regeneration is not generally critical, so long as the resin is not deleteriously affected and the aqueous mixture remains liquid. Temperatures in the range from about 10° to about 60° C. are generally advantageous, with the ambient water temperature being convenient.

The time required for regeneration of the anion exchange resin depends on numerous factors. The degree of loading, the nature of the organic compounds on the resin, the porosity of the resin, the identity of the resin, the flow rate of the aqueous liquid mixture, the composition of the aqueous liquid mixture and the temperature during regeneration all are significant factors. One of ordinary skill in the art can determine empirically the optimum conditions for regeneration of a specific resin. Whether the resin has been adequately regenerated under specific conditions can be assessed by testing the resin to determine whether its anion exchange capacity has been restored to the desired level. Higher degrees of loading may require larger quantities of acid or organic solvent or longer exposure time.

Treatment with the hydrochloric acid in the regeneration process results in tertiary amine groups of a weak base anion exchange resin being in the hydrochloride form. If desired, after regeneration the anion on the resin can be changed by treatment with a suitable reagent. However, the tertiary amine hydrochloride groups are generally preferred for removal of naphthenic acid and associated organic compounds from water.

It has been found that an anion exchange resin loaded with organic compounds following the treatment of oil field waters is not readily regenerated with caustic and acid alone. Soaking or otherwise contacting the resin partially regenerated with caustic with the aqueous alkanol and strong mineral acid mixture described hereinbefore can substantially increase the anion exchange capacity of the resin. Likewise, soaking the resin in such an aqueous alkanol/acid mixture can in some instances increase the regenerated ion exchange capacity beyond that obtained by an aqueous alkanol/acid wash alone, provided the soaking period is sufficiently long to effect additional regeneration.

Conventional engineering design practices can be used to select the size of vessels, flow rates of liquids and quantity of resin used in the subject process. Typically, a flow rate of the aqueous liquid regenerant of from about 0.5 to about 3, preferably about 1 gallon per minute per cubic foot of loaded anion exchange resin can be selected for preliminary evaluation of the regeneration of a specific loaded resin. The operating parameters can then be varied to empirically optimize regeneration of the resin.

The following example is presented to further illustrate the invention but it is not intended to otherwise limit the scope of the invention. All parts and percentages are by weight unless otherwise indicated.

EXAMPLE 1

A 38 liter sample of water from a California oil field containing 150 ppm of oil and grease was introduced at a flow rate of 10 milliliters per minute at a temperature of 40° to 50° C. and at ambient pressure into a 53 milliliter (ml) resin bed containing an amine weak base anion exchange resin in the hydrochloride form. The oil and grease content of the water after treatment with the resin was reduced by greater than 100 ppm. The oil and grease removed was predominantly naphthenic acid and other organic acids and organic sulfides.

A decline in the anion exchange capacity of the resin due to loading was observed as indicated by an increase in residual oil and grease in treated water. The anion exchange resin was rinsed with deionized water. The resin was then treated with a mixture of 200 ml of 2-butanol and 200 ml of 5 percent hydrochloric acid at ambient conditions at a flow rate of from 7 to 10 ml/minute. The resin was then rinsed once more with deionized water. The regenerated resin was found to have regained essentially 100 percent of its original anion exchange capacity.

What is claimed is:

1. An improved method for regenerating the anion exchange capacity of a weak-base resin loaded with organic acids and other organic compounds typically present in oil field waters consisting essentially of contacting the loaded anion exchange resin with an aqueous liquid mixture of a strong mineral acid and an alkanol having from 2 to 5 carbon atoms, said mixture having a mineral acid concentration of at least about 0.5 weight percent and an amount of alkanol effective to dissolve organic contaminates removed from the resin and said contact occurring for sufficient time to substantially restore the ion exchange capacity of the loaded resin.

2. The method as described in claim 1 wherein the resin bears a plurality of tertiary amine hydrochloride groups on a styrene/divinyl benzene copolymer backbone.

3. The method as described in claim 1 wherein the alkanol has from 3 to 5 carbon atoms.

4. The method as described in claim 1 wherein the alkanol is a secondary alkanol having from 3 to 4 carbon atoms.

5. The method as described in claim 1 wherein the strong mineral acid is hydrochloric acid.

6. The method as described in claim 3 wherein the strong mineral acid is hydrochloric acid.

7. The method as described in claim 4 wherein the strong mineral acid is hydrochloric acid.

8. The method as described in claim 7 wherein the loaded resin was contaminated in treatment of oil field waters.

9. The method as described in claim 7 wherein the alkanol is 2-butanol.

10. The method as described in claim 9 wherein the aqueous liquid mixture comprises about 13 to about 40 volume percent water, about 55 to about 70 volume percent 2-butanol and about 5 to about 17 volume percent of concentrated aqueous hydrogen chloride.

11. The method as described in claim 10 wherein the ion exchange resin is present in a packed column or bed and is treated with the aqueous liquid mixture by passing the mixture through the packed column or bed.

12. The method as described in claim 11 wherein the aqueous liquid mixture is a single phase when brought into contact with the ion exchange resin and the aqueous mixture after contacting the resin is initially biphasic.

13. The method as described in claim 10 further comprising recovering the aqueous mixture, separating the organic phase from the mixture and distilling the alkanol from the organic phase to recover as a residue the organic acid contaminant.

14. The method as described in claim 13 wherein the alkanol is distilled as an azeotrope with water.

15. The method as described in claim 1 wherein the aqueous alkanol distillate is recycled for use in the aqueous liquid mixture used to regenerate the anion exchange resin.

16. The method as described in claim 11 wherein the aqueous liquid mixture after contacting the ion exchange resin is a single phase.

17. A method of regenerating a weak-base anion exchange resin loaded with organic compounds typically present in oil field waters consisting essentially of:
  (a) contacting the resin with an aqueous alkali metal hydroxide for a sufficient period and at conditions to substantially restore anion exchange capacity of the resin;
  (b) separating the resin from the aqueous alkali metal hydroxide and
  (c) contacting the resin with an aqueous mixture of a $C_3$ to $C_5$ alkanol and at least 1 weight percent hydrochloric acid for a sufficient period and at conditions to further restore anion exchange capacity of the resin.

18. The method as described in claim 4 wherein the alkanol constitutes from about 20 to about 90 percent of the aqueous mixture.

19. The method as described in claim 4 wherein the alkanol constitutes from about 50 to about 75 volume percent of the aqueous mixture.

20. The method as described in claim 19 wherein the strong mineral acid constitutes at least about 2 weight percent of the aqueous mixture.

21. The method as described in claim 20 wherein the strong mineral acid is hydrochloric acid.

* * * * *